United States Patent [19]
White

[11] Patent Number: 5,144,477
[45] Date of Patent: Sep. 1, 1992

[54] METHOD OF OPERATING A SCANNING CONFOCAL IMAGING SYSTEM

[75] Inventor: John G. White, Cambridge, England

[73] Assignee: Medical Research Council, Great Britain

[21] Appl. No.: 647,661

[22] Filed: Jan. 30, 1991

Related U.S. Application Data

[60] Division of Ser. No. 561,488, Aug. 1, 1990, Pat. No. 5,032,720, Continuation of Ser. No. 464,577, Jan. 16, 1990, abandoned, Continuation of Ser. No. 179,681, Apr. 11, 1988, abandoned.

[51] Int. Cl.⁵ ..................... G02B 21/00; G02B 26/10
[52] U.S. Cl. .................................. 359/368; 359/389; 359/202; 359/208; 359/213; 359/221; 250/236
[58] Field of Search ............... 350/320, 507, 527, 524, 350/502, 274, 273, 6.6, 6.91; 250/236, 235

[56] References Cited

U.S. PATENT DOCUMENTS

| | | | |
|---|---|---|---|
| 1,573,401 | 1/1926 | Heine | 350/502 |
| 2,004,807 | 4/1934 | Fassin | |
| 2,290,874 | 7/1942 | Graff | 350/502 |
| 2,651,969 | 9/1953 | Thor | 350/502 |
| 3,013,467 | 12/1961 | Minsky | 350/524 |
| 3,287,550 | 0/1966 | Barnes | |
| 3,460,880 | 8/1969 | Henderson | 350/527 |
| 3,502,415 | 3/1970 | Hock | 250/235 |
| 3,517,980 | 6/1970 | Petran et al. | 350/527 |
| 3,518,014 | 0/1967 | Weber | |
| 3,643,015 | 0/1972 | Davidovits | |
| 3,705,755 | 0/1972 | Baer | |
| 3,721,170 | 3/1973 | Johnson | 350/502 |
| 3,768,910 | 10/1973 | Zanoni | 250/235 |
| 3,926,500 | 12/1975 | Frosch | 350/274 |
| 4,241,257 | 12/1980 | Koester | 250/235 |
| 4,251,129 | 2/1981 | Suzki | 350/527 |
| 4,284,897 | 8/1981 | Sawamura | 250/461 B |
| 4,373,774 | 2/1983 | Dubroeucq | 350/6.6 |
| 4,478,482 | 10/1984 | Koester | 350/507 |
| 4,631,581 | 12/1986 | Carlsson | 358/356 |
| 4,656,358 | 4/1987 | Divens | |
| 4,714,960 | 12/1987 | Laakmann | 350/6.8 |
| 4,843,242 | 7/1989 | Doyle | 350/527 |
| 4,852,955 | 8/1989 | Doyle et al. | 350/1.2 |
| 4,893,028 | 7/1990 | Koashi | 250/236 |
| 4,997,242 | 3/1991 | Amos | 350/6.91 |

FOREIGN PATENT DOCUMENTS

| | | |
|---|---|---|
| 155247 | 3/1985 | European Pat. Off. |
| 280375 | 8/1988 | European Pat. Off. |
| 1185839 | 11/1970 | Fed. Rep. of Germany |
| 54115890 | 4/1981 | Japan ........................ 350/527 |
| 7901027 | 9/1979 | PCT Int'l Appl. |
| 2132852 | 5/1984 | United Kingdom |
| 2152697 | 6/1985 | United Kingdom |

OTHER PUBLICATIONS

C. J. R. Sheppard and T. Wilson, "Depth of Field in the Scanning Microscope", *Optics Letters*, vol. 3, Sep. 1978, pp. 115–117.

(List continued on next page.)

*Primary Examiner*—Jon W. Henry
*Attorney, Agent, or Firm*—Townsend and Townsend

[57] ABSTRACT

A confocal scanning microscope operates to produce a small (preferably diffraction limited) spot on a sample, scan the spot over the sample in a raster pattern, and form an electrical signal corresponding to the intensity of light emanating from the region of the spot. The electrical signal is communicated to a computer which produces a visual display on a monitor. The optical train between the source (or detector) and the sample comprises first and second scanning elements, each operable to scan the beam in a different direction, an afocal assembly located between the two scanning elements so as to transfer the beam from the first scanning element to the second scanning element, and standard microscope components including an objective. The light emanating from the sample encounters the objective, the scanning elements, and the afocal assembly prior to reaching the detector. An aperture is disposed in front of the detector and blocks any light that emanated from points spatially displaced from the beam spot. The use of an afocal assembly in the optical train thus allows the elimination of pinhole spatial filters from the design.

1 Claim, 3 Drawing Sheets

OTHER PUBLICATIONS

R. L. Shoemaker et al., "An Ultrafast Laser Scanner Microscope for Digital Image Analysis", *IEEE Transaction of Biomedical Engineering*, vol. BME-29, No. 2, Feb. 1982, pp. 82–91.

Roger T. Tsien and Martin Poenie, "Fluorescence Ratio Imaging: A New Window into Intracellular Ionic Signaling", *TIBS* 11, Nov. 1986, pp. 450–455.

J. G. White and W. B. Amos; "Confocal Microscopy Comes of Age", *Nature*, vol. 328, No. 6126, pp. 183–184, Jul. 9, 1987.

V. Wilke, "Optical Scanning . . . ", *Scanning*, vol. 7,2 (1985) pp. 88–96.

T. Wilson, "Scanning Optical . . . " *Scanning*, vol. 7,2 (1985) pp. 79–87.

David A. Agard and John W. Sedat, "Three-Dimensional Architecture of a Polytene Nucleus", *Nature*, vol. 302, Apr. 21, 1983, pp. 676–681.

G. J. Barkenhoff et al., "Confocal Scanning . . . ", *Journal of Microscopy*, vol. 117, Pt. 2, Nov. 1979, pp. 219–232.

G. J. Barkenhoff, "Imaging Modes in Confocal Scanning Light Microscopy" (CSLM), *Journal of Microscopy*, vol. 117, Pt. 2, Nov. 1979, pp. 233–242.

K. Carlsson et al., "Three-Dimensional Microscopy Using a Confocal Laser Scanning Microscope", *Optics Letters*, vol. 10, No. 2, Feb. 1985, pp. 53–55.

K. R. Castleman, "Digital Image Processing" (Prentice-Hall); pp. vii–xi, 4–8, 347–377, and 379.

I. J. Cox, "Scanning Optical Fluorescence Microscopy", *Journal of Microscopy*, vol. 133, Pt. 2, Feb. 1984, pp. 149–154.

I. J. Cox, "Electronic Image Processing of Scanning Optical Microscope Images", *IEEE Conference on Electronic Image Processing*, York, 1982, Conf. Publ. No. 214, pp. 101–104.

I. J. Cox and J. R. Sheppard, "Scanning Optical Microscope Incorporating a Digital Framestore and Micro-Computer", *Applied Optics*, vol. 22, May 1983, pp. 1474–1478.

I. J. Cox and C. J. R. Sheppard, "Digital Image Processing of Confocal Images", (cite and date unknown).

D. K. Hamilton et al., "Three-Dimensional . . . ", *Appl. Phys.* B27 No. 4 (1982), pp. 211–213.

M. Petran et al., "The Tandem Scanning Reflected Light Microscope; Part 1—The Principle, and Its Design", *3 Proceedings RMS*, vol. 20, May 1985, pp. 125–129.

R. W. Wijnaendts van Resandt et al., "Optical Fluorescence Microscopy in Three Dimensions: Microtomoscopy", *Journal of Microscopy*, vol. 138, Apr. 1985, pp. 29–34.

C. J. R. Sheppard, "The Scanning Optical Microscope Optische Abtastung Mittels Misroskop", (cite and date unknown).

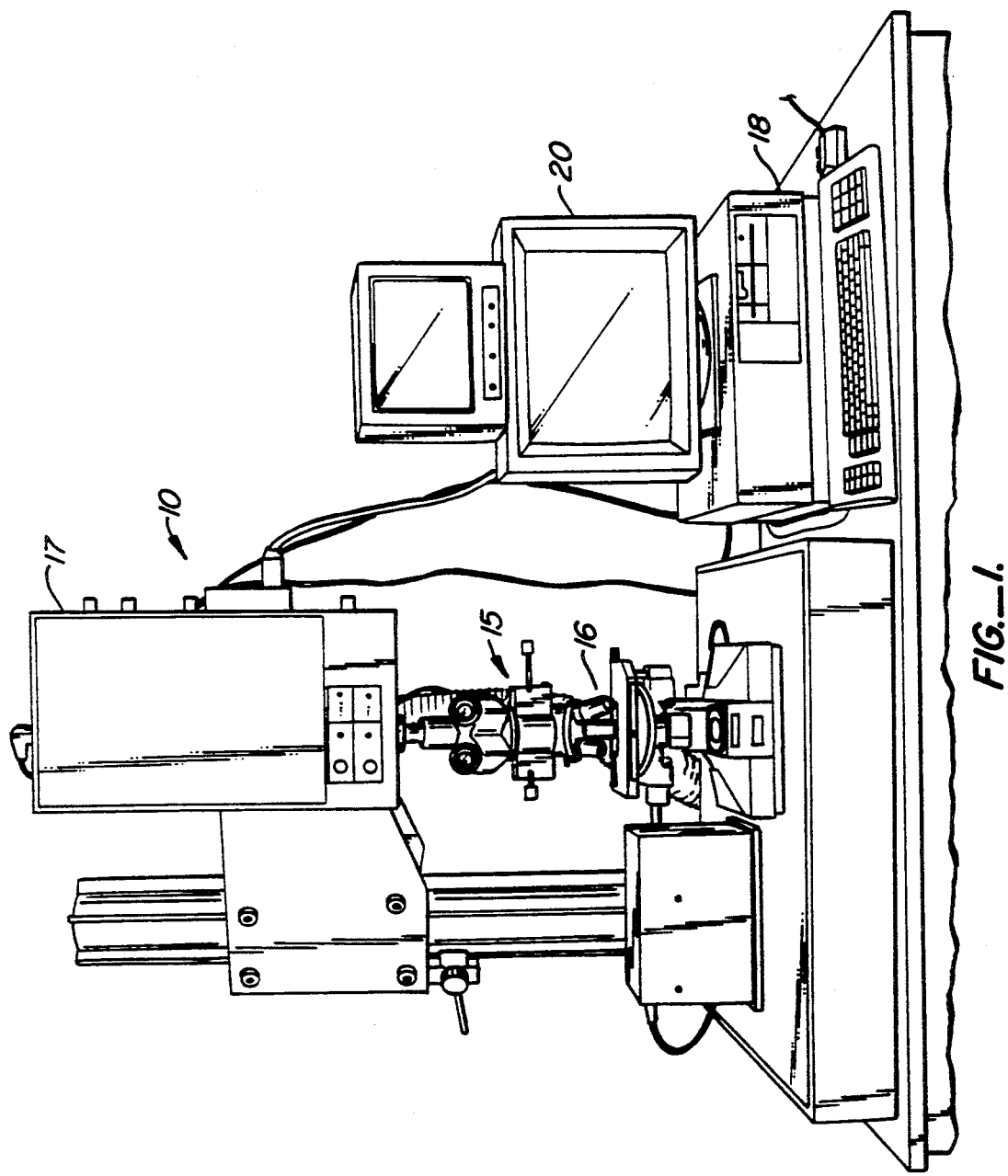
FIG._1.

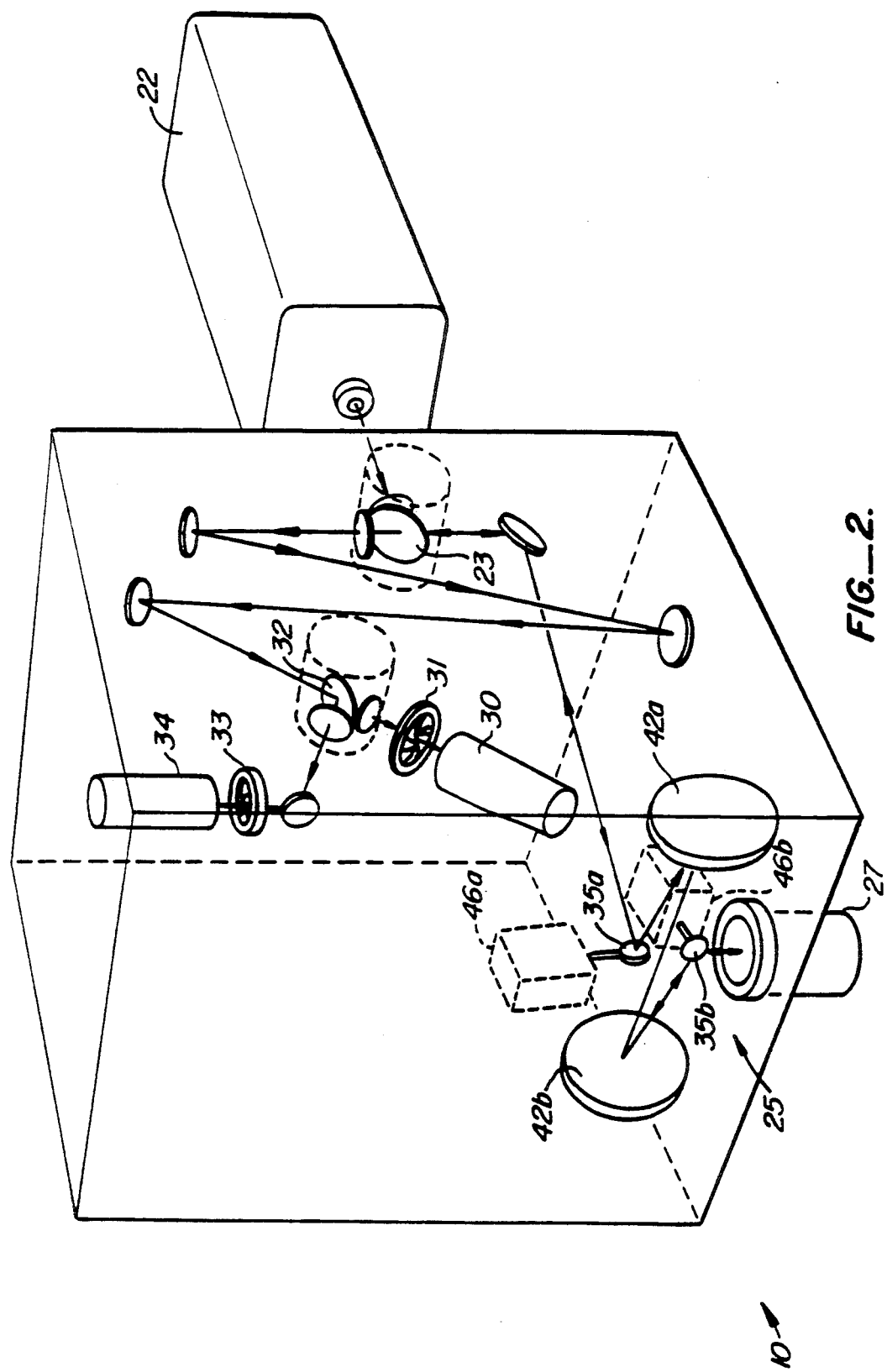
FIG._2.

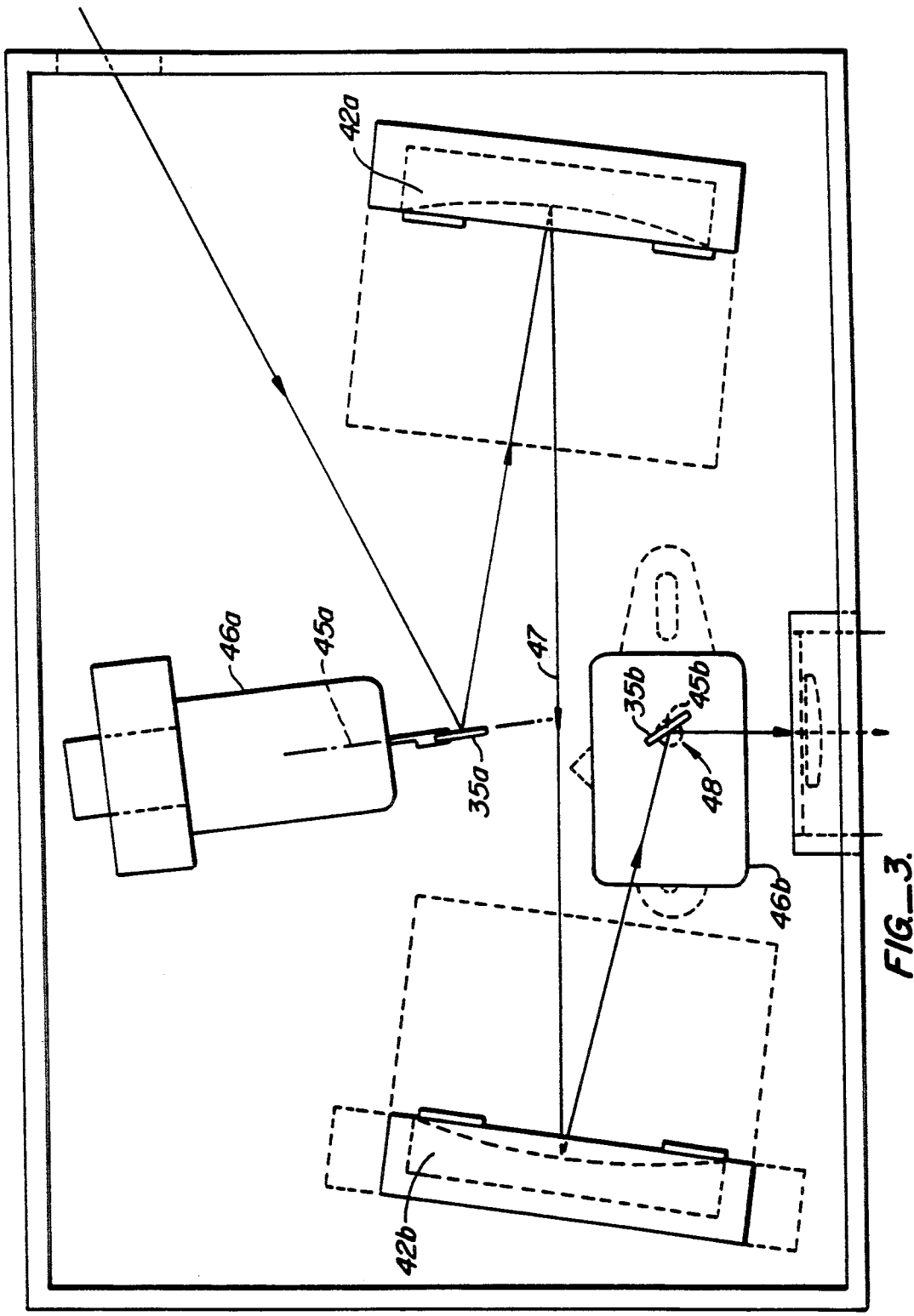
FIG_3.

METHOD OF OPERATING A SCANNING CONFOCAL IMAGING SYSTEM

This is a divisional of application Ser. No. 07/561,488, filed Aug. 1, 1990, now U.S. Pat. No. 5,032,720, issued Jul. 16, 1991 which is a continuation of 07/464,577, filed Jan. 16, 1990, now abandoned, which is a continuation of 07/179,681, filed Apr. 11, 1988, now abandoned.

FIELD OF THE INVENTION

This invention relates generally to confocal microscopy and more specifically to apparatus for providing a conventional microscope with confocal scanning capability.

BACKGROUND OF THE INVENTION

Fluorescence light microscopy is extensively used in biological research and medical diagnosis. It provides the selectivity necessary to enable specific components of a cell or tissue to be visualized and the spatial organization of such components to be determined. A major problem of the technique is that light emission from out-of-focus regions seriously degrades the signal-to-noise ratio of the image, especially when thick objects are viewed. Confocal microscopy addresses and to a large extent solves this problem. In a confocal microscope, both illumination and detection are confined to a single point in the sample. This is achieved typically by using spatial filters (usually pinholes) in the optical paths of the objective and condenser. A complete image is built up by sequentially scanning all points in the field of view.

SUMMARY OF THE INVENTION

The present invention provides a confocal scanning microscope characterized by superior resolution and rejection of out-of-focus signals. The optical train and scanning elements are disposed so that the invention can be implemented as an accessory suitable for retrofitting an existing standard microscope.

In broad terms, the microscope operates to produce a small (preferably diffraction limited) spot on a sample, scan the spot over the sample in a raster pattern, and form an electrical signal corresponding to the intensity of light emanating from the region of the spot. The electrical signal is communicated to a computer which produces a visual display on a monitor. The optical train between the source (or detector) and the sample comprises first and second scanning elements, each operable to scan the beam in a different direction, an afocal assembly located between the two scanning elements so as to transfer the beam from the first scanning element to the second scanning element, and standard microscope components including an objective. The two directions of scanning are such that the beam spot traces a raster pattern on the sample. In a preferred embodiment, the scanning elements are plane mirrors and the afocal assembly is a pair of concave mirrors.

The light emanating from the sample encounters the objective, the scanning elements, and the afocal assembly prior to reaching the detector. An aperture (preferably an iris diaphragm) is disposed in front of the detector and blocks any light that emanated from points spatially displaced from the beam spot. The use of an afocal assembly in the optical train and the absence of other focusing elements in the optical train thus allow the elimination of pinhole spatial filters and the use of iris diaphragms. Iris diaphragms have the advantages of being adjustable and relatively inexpensive and easy to align.

A further understanding of the nature and advantages of the present invention can be realized by reference to the remaining portions of the specification and the attached drawings.

BRIEF DESCRIPTION OF THE DRAWINGS

FIG. 1 is a pictorial view of a confocal microscope embodying the present invention; and FIG. 2 is a three-dimensional optical schematic of the confocal microscope; and FIG. 3 is a plan schematic view of the scanning optics assembly.

DESCRIPTION OF THE PREFERRED EMBODIMENT

FIG. 1 is a pictorial view of a confocal scanning microscope 10 embodying the present invention. The basic operation of the confocal microscope is to form a small beam spot on the sample under examination, scan the beam spot in a raster fashion, and generate a visual display corresponding to the distribution of light emanating from the sample as the beam is scanned. Typically, the light of interest from the sample is either reflected light or fluorescent radiation of longer wavelength than that of the illuminating beam.

In a preferred embodiment, confocal microscope 10 is implemented as a retrofit accessory configured to couple to a conventional microscope 15 having an objective 16 so as to provide confocal scanning capability. The optical elements (including a detector) are located in a housing 17 disposed over the microscope, and electrical signals from the detector are communicated to a computer 18. Computer 18 buffers the incoming signal to store a frame and controls the scanning mechanism in the confocal microscope. With the addition of suitable synchronizing signals, the frame can be displayed on a monitor 20. The confocal accessory conveniently attaches to the camera port of the conventional microscope. The camera port is normally provided with an eyepiece, but alignment of the optical components is facilitated by providing an eyepiece in the accessory and removing the eyepiece from the conventional microscope.

FIG. 2 is a three-dimensional optical schematic of confocal microscope 10. Although specific dimensions are not part of the invention, they will be indicated for illustrative purposes. The proportions have been altered for the sake of clarity; in the preferred embodiment the unit is not cube-shaped but is elongated vertically.

A light source 22 such as an argon ion laser emits a beam that encounters an optical train comprising a beam splitter 23, a scanning optics assembly 25, an eyepiece 27, and objective 16 (not shown in FIG. 2). The objective focuses the beam to form the spot on the sample. Light emanating from the sample in the region of the spot passes along the same path (but in the reverse direction) as the incoming laser light until it reaches beam splitter 23, at which point it is directed to a detector 30 such as a photomultiplier tube. An iris diaphragm 31 (variable 0.7–7.0 mm) is disposed in front of the detector. The optical path from the scanning optics assembly to the detector is folded by means of a number of plane mirrors in order to provide a relatively long path length.

The optical train on the reverse path optionally includes a second beam splitter 32 which directs light through a second iris diaphragm 33 to a second detector 34. Such an arrangement makes it possible to perform dual channel fluorescence detection in the event that the emitted light is in two wavelength ranges (which may arise from two different fluorescent stains).

Scanning optics assembly 25 is shown in the three-dimensional rendering of FIG. 2 and in the plan schematic of FIG. 3. In the preferred embodiment, scanning optics assembly 25 comprises first and second plane mirrors 35a and 35b and an afocal assembly located optically therebetween. The afocal assembly comprises first and second concave mirrors 42a and 42b. The mirrors are disposed so that the incoming beam is subjected to four successive reflections, namely from mirrors 35a, 42a, 42b, and 35b, as will be explained in detail below.

Plane mirror 35a is normally disposed at an angle to the direction of the incoming beam and is rotatable about an axis 45a. Axis 45a lies in the plane of the reflective surface of plane mirror 35a and in the plane of FIG. 3. Thus, rotation of mirror 35a about axis 45a causes an angular scan of the beam into and out of the plane of FIG. 3. Plane mirror 35b is normally disposed at an angle to the direction of the outgoing beam and is rotatable about an axis 45b. Axis 45b lies in the plane of the reflective surface of plane mirror 35b and is perpendicular to the plane of FIG. 3. Thus rotation of mirror 35b about axis 45b causes a angular scan of the beam in the plane of FIG. 3. Plane mirrors 35a and 35b are driven by respective hgalvanometers 46a and 46b (shown in phantom) suitable for imparting angular displacements of about $\pm 17.5°$ at the line and frame rates of 525 $\sec^{-1}$ and 1 $\sec^{-1}$.

Concave mirrors 42a and 42b face each other and function as a telescope for transferring the beam from plane mirror 35a to plane mirror 35b and thence to eyepiece 27. The concave mirrors may be spherical, paraboloidal, or of another form. In the illustrative embodiment, the diameters are 50 mm and the focal lengths are 75 mm. There is no absolute requirement that the focal lengths of the two mirrors be equal, and indeed the use of different focal lengths provides degrees of freedom over the basic scan angles and the width of the beam at the eyepiece. Since the scanned beam only traces a narrow strip on each of the concave mirrors, the concave mirrors need not be circular in outline, but rather can be in the form of strips (length about 50 mm).

During operation of the microscope, the laser beam, which is collimated (or nearly so), falls sequentially on plane mirror 35a, concave mirror 42a, concave mirror 42b, and plane mirror 35b. The light reflected from concave mirror 42a is focused at an intermediate point, denoted 47, whose location varies as the scan angle of mirror 35a varies. The light then emerges from point 47 whereupon concave mirror 42b restores the beam to its collimated state and redirects it to plane mirror 35 where it reflects from a stationary region 48 along axis of rotation 45b. Thus, the beam has been scanned in two directions and the afocal assembly has operated to transfer the beam from the first scanning element to the second scanning element. The scanning optics assembly is located so that the exit pupil of microscope eyepiece 27 falls on the area of plane mirror 35b near axis 45b. In this way, the collimated beam emergent from the scanning assembly is coupled to eyepiece 27 and thence to objective 16, which focuses the beam to a small spot.

Light emanating from the sample includes reflected light, fluorescent light, and possibly light due to other processes. This light follows the path of the original beam though objective 16, eyepiece 27, and scanning assembly 25. The type of beam splitter 23 depends on the light that is intended to reach detector 30. If reflected light is the measurement of interest, a half-silvered mirror is used. If fluorescent light is to be viewed, a suitable dichroic reflector is used. The light then travels to detector 30. The function of iris diaphragm 31 is to limit the light reaching the detector to that emanating from points in the immediate vicinity of the beam spot. The ability of the aperture to perform this function depends on the angle that the aperture subtends. This angle is rendered small by using an optical lever. That is, the path length from the scanning optics assembly to the aperture is made large (about 1500 mm) by folding the beam path as described above.

The use of an iris diaphragm as an aperture is made possible by the fact that the beam is not brought to a focus on the aperture. Indeed, the beam is relatively wide (greater than 1 mm diameter) throughout the system except for point 47 between concave mirrors 42a and 42b. Compared to pinhole apertures, iris diaphragms are inexpensive and easy to align. Since the beam is collimated (or nearly so), and therefore is not brought to focus on the aperture, there is no need for any critical adjustment along the beam axis. An additional key feature, not available with pinholes, is adjustability. The user is able to trade resolution (depth of confocal volume) for sensitivity (amount of light) and thus achieve an optimized result.

In conclusion, it can be seen that the present invention employs a simple and efficient optical configuration that provides a high degree of spatial selectivity without resort to pinhole spatial filters and the like. In the preferred embodiment, where all the elements in the scanning assembly are reflectors, the system is free of chromatic aberrations. Moreover, since the scanning occurs in the accessory rather than at the sample (i.e., before magnification) the scanning elements may be fabricated to less precise tolerances than would otherwise be required, and the instrument is less sensitive to external vibrations.

While the above is a complete description of the preferred embodiment of the invention, various modifications, alternatives, and equivalents may be used. For example, a possible embodiment might utilize refractive telescopes to couple the beam between the scanning elements. Therefore, the above description and illustrations should not be taken as limiting the scope of the invention which is defined by the appended claims.

I claim:

1. In the operation of a scanning confocal microscope, a method comprising the steps of:
   forming a beam spot;
   collecting light emanating from the region of the beam spot;
   directing the light so collected along a path;
   collimating the light along the path, the light so collimated being generally characterized by a beam diameter;
   passing the light through an aperture generally commensurate in size with the beam diameter, the path length to the aperture being relatively long compared to the aperture, the path being further devoid of pinhole spatial filters;
   detecting the light passing through the aperture; and
   said collecting, directing, collimating, and passing steps being performed to prevent light that emanates from points away from the beam spot location from passing through the aperture and being detected by said detecting step.

* * * * *